(12) United States Patent
Yamada

(10) Patent No.: US 7,909,372 B2
(45) Date of Patent: Mar. 22, 2011

(54) STRIKER APPARATUS FOR VEHICLE

(75) Inventor: Yukifumi Yamada, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/038,440

(22) Filed: Feb. 27, 2008

(65) Prior Publication Data

US 2008/0217932 A1 Sep. 11, 2008

(30) Foreign Application Priority Data

Mar. 9, 2007 (JP) ................. 2007-060272

(51) Int. Cl.
*E05B 15/02* (2006.01)
(52) U.S. Cl. ..................................... 292/340
(58) Field of Classification Search ................. 292/340, 292/DIG. 26, 341, 341.11–19
See application file for complete search history.

(56) References Cited

U.S. PATENT DOCUMENTS

| | | | |
|---|---|---|---|
| 5,707,092 A * | 1/1998 | Van Slembrouck et al. | 292/341.19 |
| 5,716,085 A | 2/1998 | Kobayashi | |
| 6,068,309 A * | 5/2000 | Jung et al. | 292/341.17 |
| 6,257,632 B1 * | 7/2001 | Jung et al. | 292/341.18 |
| 6,616,204 B1 * | 9/2003 | Mitts et al. | 292/341.18 |
| 6,814,401 B2 * | 11/2004 | Takada | 296/202 |
| 7,159,910 B2 * | 1/2007 | Hwang | 292/341.15 |
| 7,275,774 B2 * | 10/2007 | Oberheide | 292/341.16 |

FOREIGN PATENT DOCUMENTS

JP 8-199870 8/1996

* cited by examiner

*Primary Examiner* — Carlos Lugo
*Assistant Examiner* — Mark Williams
(74) *Attorney, Agent, or Firm* — Oblon, Spivak, McClelland, Maier & Neustadt, L.L.P.

(57) ABSTRACT

A striker apparatus for a vehicle includes a striker adapted to be engaged with a locking member secured at an engaging object and having a pair of base portions, a base member having a pair of attaching holes, a reinforcement member placed on the base member and including a pair of insertion holes opening to face the pair of attaching holes respectively, and a pair of flanges formed at each of base portions being inserted into each of the pair of the attaching holes and each of the insertion holes for holding the base member and the reinforcement member therebetween.

15 Claims, 3 Drawing Sheets

4··· Locking member
11c··· Attaching hole
13··· Reinforcement member
14··· Striker
14a··· Insertion hole
27, 28··· flanges

STRIKER APPARATUS FOR VEHICLE

CROSS REFERENCE TO RELATED APPLICATIONS

This application is based on and claims priority under 35 U.S.C. §119 to Japanese Patent Application 2007-060272, filed on Mar. 9, 2007, the entire contents of which is incorporated herein by reference.

FIELD OF THE INVENTION

The present invention relates to a striker apparatus for a vehicle.

BACKGROUND

A striker apparatus for a vehicle is disclosed in, for example, JP 1996199870A. A striker is formed in a substantially U-shape, and base portions of the striker are fixed at a base plate through attaching holes of the base plate. The striker is inserted into a striker passage formed at a cover plate of a door lock body so that the striker is engaged with a latch supported at the cover plate. In the striker apparatus disclosed in JP1996199870A, a cross-section of a portion of the striker, with which the latch is engaged, is formed in a substantially ellipse-shape in which a longitudinal axis thereof is extending towards the striker inserting direction. This allows the striker apparatus disclosed in JP1996199870A to achieve minimization of a width of the striker passage without deteriorating strength of the striker.

The striker apparatus disclosed in JP1996199870A achieves flattening of a cross-section of the striker. However, flattening of the cross-section of the striker does not result in sufficient improvement in a flexural rigidity of the striker. A relationship between a bending moment generated at the striker and a load applied to the base portions of the striker will be described below in accordance with a schematic diagram illustrated in FIG. 4. As illustrated in FIG. 4, a striker 91 is connected/fixed with/at a base plate 94 by a pair of flanges 92, 93 formed at each of base portions of the striker 91 so as to hold the base plate 94 therebetween. A bending moment M generated at the striker 91 because of a load F reaches a maximum value M-max at the base portions of the striker 91 at which the striker 91 is fixed at the base plate 94 by means of the flanges 92, 93. The maximum value M-max is variable depending on a distance L between a load application point and the base portions of the striker 91. Hence, when the maximum value M-max increases in response to an increase of the distance L, and further, when a load f applied to the flanges 92, 93 increases, shear failure may occur on the flanges 92 and 93. In addition, the attaching hole of the base plate 94 may be enlarged, and furthermore, flexural strains generated at the base portion of the striker 91 where the flanges 92 and 93 are formed may exceed a permissible level to thereby cause a deformation of the striker 91. Therefore, flattening of the cross-section of the striker is not sufficient for improving the flexural rigidity of the striker.

When a distance of load f generated between the flanges 92 and 93 on the basis of the bending moment M (maximum value M-max) is set to 1, a following relationship between the load F and the distance L is substantially satisfied:

$$F * L \propto f * 1$$

Hence, the longer the distance L becomes, or the shorter the distance 1 becomes, the larger the load f applied to the flanges 92 and 93 becomes. As a result, the flexural rigidity of the striker may be deteriorated.

A need thus exists to provide a striker apparatus which is not susceptible to the drawback mentioned above.

SUMMARY OF THE INVENTION

According to an aspect of the present invention, a striker apparatus for a vehicle includes a striker adapted to be engaged with a locking member secured at an engaging object and having a pair of base portions, a base member having a pair of attaching holes, a reinforcement member placed on the base member and including a pair of insertion holes opening to face the pair of attaching holes respectively, and a pair of flanges formed at each of base portions being inserted into each of the pair of the attaching holes and each of the insertion holes for holding the base member and the reinforcement member therebetween.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
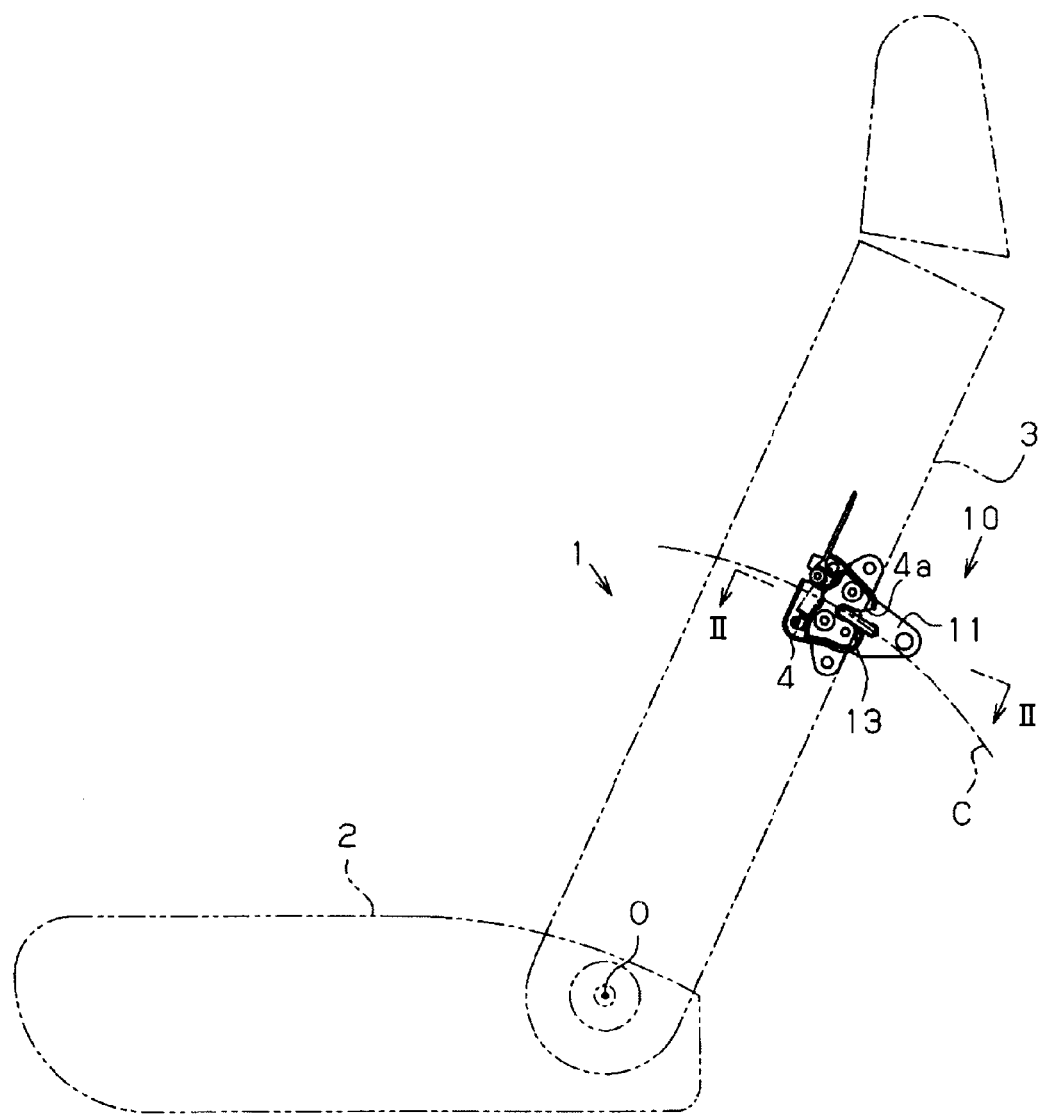
FIG. 1 is a side view schematically illustrating a vehicle seat.

An embodiment of a striker apparatus according to the present invention is described below in accordance with the attached drawings. FIG. 1 is a side view schematically illustrating a vehicle seat 1 (hereinafter referred to as a seat 1) mounted at a rear seat side of a vehicle such as an automobile. As illustrated in FIG. 1, the seat 1 is formed with a seat cushion 2 forming a seating surface and a seat back frame 3. The seat back frame 3 is supported at a rear end portion of the seat cushion 2 so as to be tiltable around a rotation axis O, and the seat back frame 3 functions as an engaging object with a striker apparatus 10. Further, the seat back frame 3 forms a frame of a seat back.

A locking member 4 is secured at the seat back frame 3. The locking member 4 is moved along an arc C in conjunction with a tilting of the seat back frame 3 around the rotation axis O.

A base plate 11 functioning as a base member is attached to a side surface of the vehicle body so as to correspond to the arc C, in other words, the base plate 11 is secured at the side surface of the vehicle along the arc C. A striker 13 is connected to the base plate 11 so as to face a striker passage 4a formed at a rear end portion of the locking member 4. In this embodiment, a cross-section of the striker 13 is formed, for example, in a round shape. The striker apparatus 10 is formed with the base plate 11, the striker 13 and the like. An end portion of the striker 13 is guided along the striker passage 4a of the locking member 4. Then, the striker 13 is secured with a latch mechanism (not shown) formed within the locking member 4. As a result, an inclined angle of the seat back (i.e., the seat back frame 3) is retained at a predetermined angle.

Figure 2:
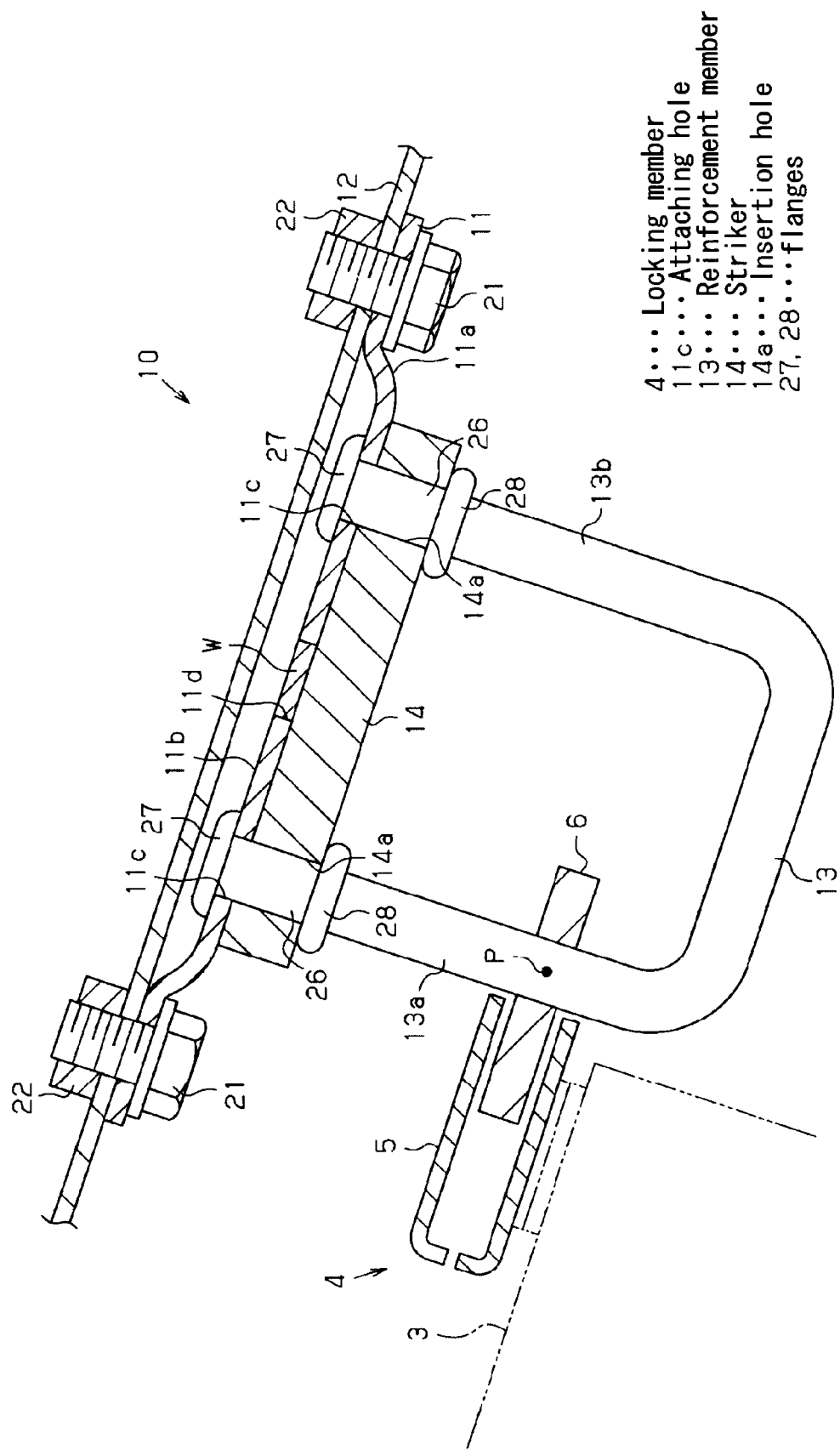
FIG. 2 is a cross-sectional view illustrating a striker apparatus of an embodiment.
Figure 3:
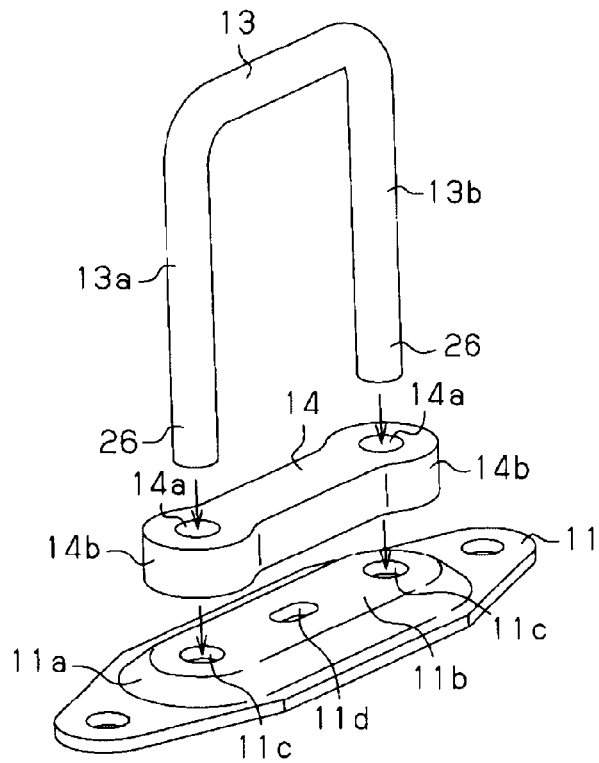
FIG. 3 is an exploded perspective view illustrating the embodiment.
Figure 4:
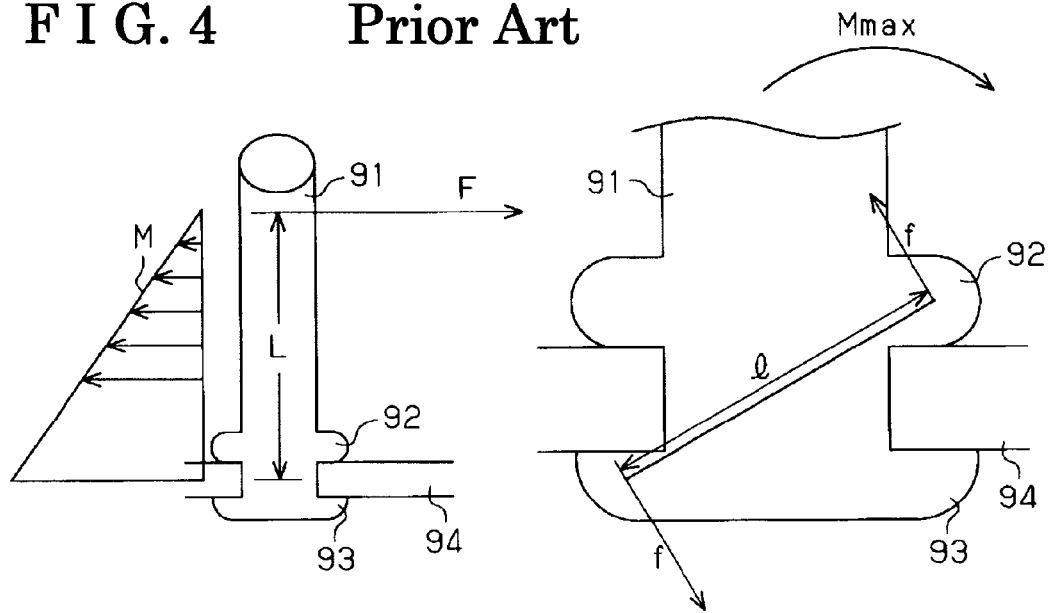
FIG. 4 illustrates explanatory diagrams showing a relationship between a bending moment generated at a striker and a load applied to a base portion of the striker.

The striker apparatus 10 will be described below in accordance with FIGS. 2 and 3 of the attached drawings. FIG. 2 is a sectional view of the striker apparatus 10 taken along line II-II of FIG. 1. FIG. 3 is an exploded perspective view of the striker apparatus 10.

As illustrated in FIG. 2, the side surface of the vehicle body is formed with a body member 12 made of a plate material. The base plate 11 made of a plate material is fixed at the body member 12 at both sides (wherein after referred to as fixing portions) of the base plate 11 by means of a bolt 21 and a nut 22. A flat portion 11b is raised so as to space away from the body member 12 in order to form a platform via inclined surfaces 11a. Each of the inclined surface 11a is formed at an inner side of each of the fixing portions of the base plate 11. Further, a pair of attaching holes 11c is formed on the flat portion 11b along a line connecting both fixing portions of the base plate 11. Moreover, a joint hole 11d is formed at a center portion between the two fixing holes 11d. Additionally, the base plate 11 is symmetrically structured relative to a line orthogonal to the line connecting the two fixing holes 11d and running a center point between the two fixing holes 11d.

A reinforcement member 14 formed with a rod material in rectangular-shape in section is placed upon a surface of the base plate 11 so as to face opposite from the body member 12. A pair of insertion holes 14a is formed at end portions of the reinforcement member 14 respectively. Each of the insertion holes 14a is formed so as to face each of the attaching holes 11c. Further, a curved portion 14b in an enlarged arc-shape is formed around each of the insertion holes 14a so as to secure a predetermined thickness in a radial direction thereof. In addition, the reinforcement member 14 is fixed to the base plate 11 by fluxing a welding material W filling the joint hole 11d.

The striker 13 is formed with a round bar material and forms a bracket-shape. One end portion 13a and the other end portion 13b of the striker 13 are connected with the base plate 11 together with the reinforcement member 14. More specifically, a pair of flanges 27 and 28 is formed at a base portion 26 of each of the one end and the other end portions 13a and 13b. Each of the one end and the other end portions 13a and 13b of the striker 13 is inserted into the insertion hole 14a and the attaching hole 11c. The flanges 27 and 28 are formed at each of base portions 26 so as to hold the reinforcement member 14 and the base plate 11 therebetween. Further, the flanges 27 and 28 are formed by a known flanging process by forging. Specifically, the flanges 27 and 28 are formed by locally applying electromagnetic heat to the striker 13. Further, in this embodiment, height of the reinforcement member 14 is set to be longer than a protrusion length of the flanges 27 and 28 from the base portions in a radial direction thereof.

According to the above-structured striker apparatus, when the locking member 4 is disengaged from the striker 13, the seat back frame 3 becomes tiltable around the rotation axis O in a range where the seat back frame 3 does not contact peripheral members including the striker apparatus. Further, when the seat back frame 3 is tilted around the rotation axis O, the one end portion 13a of the striker 13 is engaged with a latch 6 forming the latch mechanism and supported at a base arm 5 of the locking member, as illustrated in FIG. 2. As a result, a tilted angle of the seat back (i.e., the seat back frame 3) is retained at a predetermined angle.

For example, assuming that a load is applied to the striker 13 at an engaging point at which the striker is engaged with the latch 6, a bending moment generated at the base portions 26 of the striker 13 because of the load applied to the striker 13 is reduced, because a distance from a load application point P (see FIG. 2) and the base portions 26 of the striker is shortened by the thickness of the reinforcement member 14. Similarly, load applied to each of the flanges 27 and 28 is reduced because a distance between the flanges 27 and the flanges 28 is extended for a distance corresponding to the thickness of the reinforcement member 14. Hence, flexural rigidity of the striker 13 at the base portions 26 is increased.

As mentioned above, according to the embodiment, the following effects are achieved. Firstly, the flexural rigidity of the striker 13 at the base portions 26 is increased. Therefore, shear failure may be prevented from occurring at the flanges 27 and 28, the attaching holes 11c may be prevented from being enlarged, and further, deformation of the striker 13 occurred due to flexural strains generated at the base portion of the striker 13 where the flanges 27 and 28 are formed exceeding a permissible level may be prevented.

Secondly, according to the striker apparatus 10 of the embodiment, the flexural rigidity of the reinforcement member 14 is increased, because the reinforcement member 14 is formed as an integral portion that connects the base portions 26 of the striker 13. Further, the number of components used to form the striker 13 is reduced.

Thirdly, according to the striker apparatus 10 of the embodiment, the reinforcement member 14 is welded to the base plate 11 at the center portion (the joint hole 11d) between the two attaching holes 11c by means of the welding metal W so that the base plate 11 and the reinforcement member 14 are rigidly integrated. Hence, for example, the load generated at the striker 13 is prevented from being applied separately and individually to the base plate 11 and the reinforcement member 14. As a result, the rigidity of the base plate (base member) 11 and the reinforcement member 14 in a shearing direction is increased.

Modifications may be applied to the striker apparatus 10 of the embodiment as follows. The base plate 11 and the reinforcement member 14 may be secured by means of, for example, a bolt and a nut at the center portion between the two attaching holes 11c (the two insertion holes 14a).

In the above-mentioned embodiment, the striker apparatus 10 includes the reinforcement member 14 on which the two insertion holes 14a for inserting the both base portions 26 of the striker 13 therethrough are integrally formed. However, two reinforcement members, each of which has an insertion hole for inserting each of the base portions 26 therethrough, may be provided at the striker apparatus.

The base plate 11 and the reinforcement member 14 may be integrally formed as one member. More specifically, a reinforcement portion substitutive to the reinforcement member 14 may be integrally formed with the base plate 11 so as to surround each of the attaching holes 11c in order to increase thickness of a peripheral portion thereof. Even when the two reinforcement portions are provided to the striker apparatus 10, the same advantageous effects as the above-mentioned embodiment is achieved.

In the striker apparatus 10 of the above-mentioned embodiment, the seat back frame 3 is employed as an object to be engaged. However, a vehicle door and the like may be employed. When the vehicle door is employed, the striker firmly retains the vehicle door in a fully closed state by the striker being engaged with a locking member secured at the vehicle door.

Accordingly, the striker 13 is connected/fixed at the base plate 11 together with the reinforcement member 14 by the flanges 27, 28 formed at each of the base portions 26 holding the base plate 11 and the reinforcement member 14. Each of the base portions 26 of the striker 13 is inserted into the insertion hole 14a and the attaching hole 11c. In a case where the striker 13 is structured as above, the bending moment generated at the base portions 26 of the striker 13 when the load is applied to the striker 13 is reduced, because the distance between the load application point P (point of application of load) and the base portions 26 is shortened by the thickness of the reinforcement member 14. Further, the load applied to the flanges 27, 28 is reduced, because the distance between the flanges 27 and the flanges 28 is shortened for the thickness of the reinforcement member 14. As a result, the flexural rigidity of the striker 13 at the base portions is increased.

According to the embodiment, the reinforcement member 14 is an integral portion having the two attaching holes 14a into which the base portions 26 of the striker 13 are inserted respectively.

Accordingly, the reinforcement member 14 is formed as the integral portion connecting both base portions 26 of the striker 13. Hence, the rigidity of the reinforcement member 14 is increased.

According to the embodiment, the base plate 11 and the reinforcement member 14 are fixed by welding at a center portion between the two attaching holes 11c.

Accordingly, the reinforcement member 14 is welded to the base plate 11 at the center portion between the two attaching holes 11c so that the reinforcement member 14 and the base plate 11 are rigidly integrated. Therefore, for example, the load generated at the striker 13 is prevented from being applied to the reinforcement member 14 and the base plate 11 separately and individually. As a result, the rigidity of the base plate 11 and the reinforcement member 14 in the shearing direction is increased.

According to the embodiment, the height of the reinforcement member 14 is formed to be longer than a protrusion length of the flanges 27, 28.

Accordingly, sufficient distances between the flanges 27 and 28 are secured. As a result, the flexural rigidity of the striker 13 at the base portions 26 is surely increased.

Accordingly, the flexural rigidity of the striker at the base portions 26 is increased.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A striker apparatus for a vehicle comprising:
 a striker adapted to be engaged with a locking member secured at an engaging object and, the striker including a U-shaped configuration with a pair of base portions;
 a base member including a pair of attaching holes;
 a reinforcement member placed on the base member and including a pair of insertion holes opening to face the pair of attaching holes respectively, one of the insertion holes and its facing attaching hole being in receipt of one of the base portions of the striker, the other of the insertion holes and its facing attaching hole being in receipt of the other of the base portions of the striker; and
 first and second pairs of flanges, each pair of flanges individually sandwiching the base member and the reinforcement member for securing the striker with the base member and the reinforcement member, the first pair of flanges provided on a first of the base portions of the striker, and the second pair of flanges disposed on a second of the base portions of the striker, each flange of the first and second pairs of flanges protruding radially outwardly from the base portion on which the flange is disposed.

2. The striker apparatus for a vehicle according to claim 1, wherein the reinforcement member comprises a one-piece article including the two attaching holes into which the base portions of the striker are inserted respectively.

3. The striker apparatus for a vehicle according to claim 2, wherein the base member and the reinforcement member are welded together at a center portion between the two attaching holes.

4. The striker apparatus for a vehicle according to claim 3, wherein, measured in a direction along one of the base portions of the striker, the thickness of the reinforcement member is greater than a radial protrusion length of the flanges.

5. The striker apparatus for a vehicle according to claim 2, wherein, measured in a direction along one of the base portions of the striker, the thickness of the reinforcement member is greater than a radial protrusion length of the flanges.

6. The striker apparatus for a vehicle according to claim 1, wherein, measured in a direction along one of the base portions of the striker, a thickness of the reinforcement member is greater than a radial protrusion length of the flanges.

7. The striker apparatus for a vehicle according to claim 1, wherein the pair of flanges are formed integrally with each of the base portions of the striker.

8. The striker apparatus for a vehicle according to claim 1, wherein a width of the reinforcement member around each of the insertion holes in the reinforcement member, as viewed in a direction parallel to axes of the insertion holes, is greater than a width of the reinforcement member between the insertion holes.

9. The striker apparatus for a vehicle according to claim 1, wherein the base member is bolted to a vehicle body.

10. The striker apparatus for a vehicle according to claim 9, wherein the base member includes a raised portion separated from the vehicle body by a gap.

11. The striker apparatus for a vehicle according to claim 10, wherein the raised portion is flat.

12. The striker apparatus for a vehicle according to claim 9, wherein the base member is disposed between the vehicle body and the reinforcement member.

13. The striker apparatus for a vehicle according to claim 1, wherein one flange of the first pair of flanges is disposed on a first end of the striker, and one flange of the second pair of flanges is disposed on a second end of the striker opposite the first end of the striker.

14. The striker apparatus for a vehicle according to claim 13, wherein the flanges are greater in diameter than the remainder of the striker.

15. The striker apparatus for a vehicle according to claim 14,
 wherein one flange in each of the first and second pairs of flanges directly contacts the base member, and
 wherein one flange in each of the first and second pairs of flanges directly contacts the reinforcement member.

* * * * *